Figure 3:
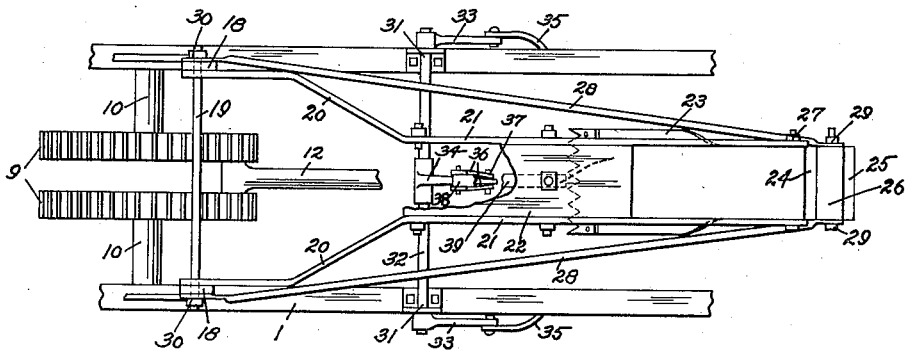

J. W. BURKETT.
HAY PRESS.
APPLICATION FILED FEB. 8, 1913.
1,091,912.
Patented Mar. 31, 1914.
2 SHEETS—SHEET 1.
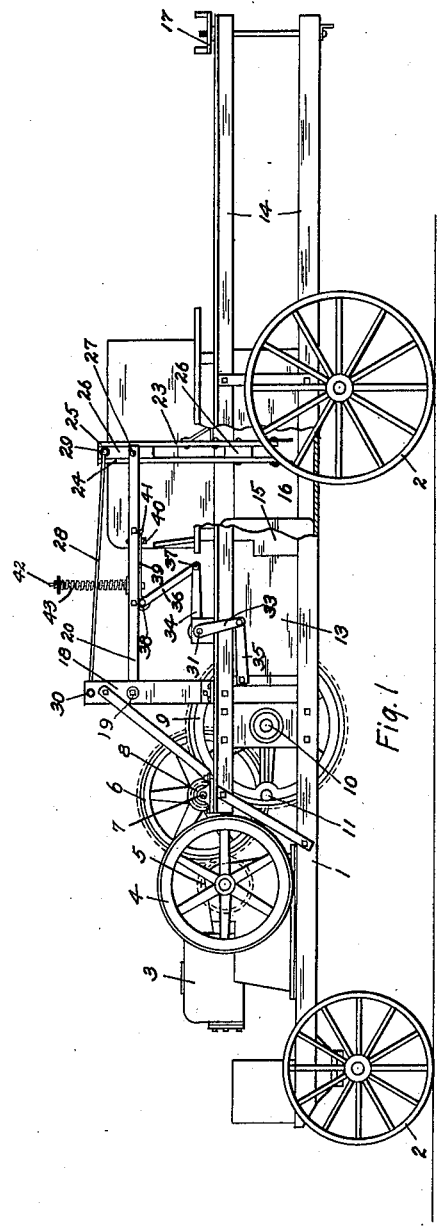
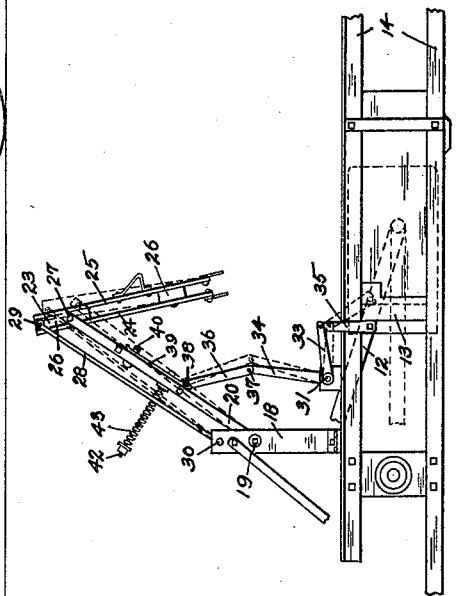
Witnesses
L. W. Frost
A. L. Phelps
Inventor
John W. Burkett
By
C. C. Shepherd, Attorney

J. W. BURKETT.
HAY PRESS.
APPLICATION FILED FEB. 8, 1913.

1,091,912.

Patented Mar. 31, 1914.

2 SHEETS—SHEET 2.

Witnesses
L. W. Frost
A. L. Phelps

Inventor
John W. Burkett

By
C. C. Shepherd
Attorney

UNITED STATES PATENT OFFICE.

JOHN W. BURKETT, OF COLUMBUS, OHIO, ASSIGNOR TO THE BURKETT MANUFACTURING COMPANY, OF COLUMBUS, OHIO, A CORPORATION OF OHIO.

HAY-PRESS.

1,091,912.

Specification of Letters Patent. Patented Mar. 31, 1914.

Application filed February 8, 1913. Serial No. 747,018.

*To all whom it may concern:*

Be it known that I, JOHN W. BURKETT, a citizen of the United States, residing at Columbus, in the county of Franklin and State of Ohio, have invented certain new and useful Improvements in Hay-Presses, of which the following is a specification.

My invention relates to hay presses and is particularly directed to the provision of an improved means of giving motion to the feeder head used in connection with the ordinary hay press.

It has been common practice to operate the feeder head from the pitman, but such construction is such that large feed openings are provided when the feeder head is going into the chamber, but before it starts out, the plunger for pressing or compressing the hay or straw closes upon it so tightly that it causes the feeder head to partially raise the hay away from the bottom of the chamber, which will make the bale loose and imperfect at the bottom.

My invention aims particularly to overcome the drawbacks incident to such construction, by providing means for giving the feeder head the same motion and requiring the same amount of time going into the bale chamber, as it has coming out.

My invention also provides a construction wherein the feeder head is inserted and withdrawn from the baling chamber when the plunger passes a predetermined point in its travel in its movement outward and inward of the baling chamber, respectively.

These objects I desirably attain by taking the motion for the feeder head directly off of the plunger as opposed to the pitman, as has frequently been done. More particularly, I aim to have the feeder head in its lowest position in the baling chamber when the plunger is in its outermost position and the feeder head in its highest position when the plunger is in its innermost position. By interposing a link connection between the plunger and the actuating mechanism proper for the feeder head, it will be apparent that the feeder head will be in an elevated position through substantially three-fourths of the complete cycle of operation of the plunger and also that, by properly locating these elements, the feeder head will be substantially stationary when in its uppermost position through a perceptible movement of the plunger.

Other objects of my invention and the advantages resulting therefrom, will be apparent from a more detailed description thereof.

Figure 4:
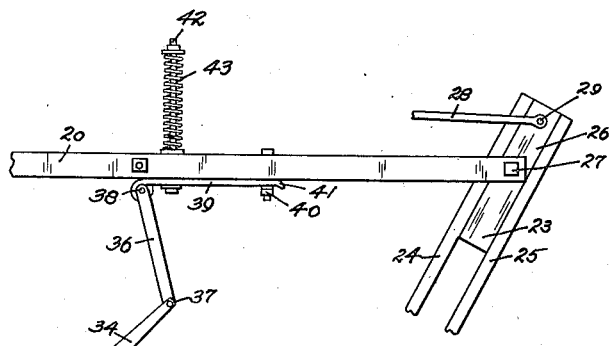

The preferred embodiment of my invention is illustrated in the accompanying drawings, in which similar characters of reference designate corresponding parts, and in which:

Figure 1 is a side view of a portable baling press showing my invention applied thereto, Fig. 2 is an enlarged view showing the feeder head in two positions when using my invention, Fig. 3 is a partial plan view of the baling press shown in Fig. 1 and showing my invention as applied thereto, and, Fig. 4 is a side view of a portion of the feeder head construction.

In the drawings, I have shown a well known type of baling press, comprising a general framework 1 mounted in a manner to be readily transported by means of wheels 2. Directly mounted upon the framework 1 is a suitable engine 3 having a fly wheel 4 and being also provided with a driving pinion 5. This driving pinion 5 is adapted to mesh with a complemental gear 6 mounted upon a shaft 7 and suitably journaled upon another portion of the general framework 1. The shaft 7 also carries in any desirable manner pinions 8, which are adapted to mesh with twin gears 9 of the correct size and proportion. The twin gears 9 are mounted upon two stub shafts 10 also carried by the general framework 1 and are held in spaced relation with each other to permit the rotating of the cross pin 11 journaled therebetween and forming the connection for the pitman 12 of the plunger 13. The angle irons 14 of the general framework 1 form the framework of the baling chamber, the one side wall 15 of which is shown partially broken away as indicated at 16. The angle irons 14 are continued rearwardly and form the passageway for the bales, the compactness of which is regulated by adjusting the distance between the angles by the bolt and hand nut structure 17 carried at the extreme outer portion.

The upwardly extending standards 18, also suitably carried by the general framework 1, form the means for supporting the cross rod 19 upon which are pivotally mounted the two bars 20 forming a portion of the feeder head structure. As more clearly shown in Fig. 3, the bars 20 extend rearwardly a slight distance and then are inclined toward each other and again are bent to be parallel and extend rearwardly as indicated at 21. Between the portions 21 of the bars 20, I desirably bolt a spacing block 22 to form a comparatively rigid structure. The arm portion 23 of the feeder head is shown as comprising two bars 24 and 25 spaced apart by a plurality of spacing blocks 26 by means of which the arm, as a whole, is pivotally mounted at 27 to the rearwardly extending bars 20. In order to give the correct motion to the arm, while the bars 20 are being moved, I provide tie rods 28 pivotally mounted to the arm at 29 and to the supporting standards 18 at 30.

My preferred means of imparting motion to the feeder head is by pivotally mounting a bell crank to the general framework 1 at 31 and shown as comprising a cross rod 32 rigidly carrying at each end outwardly extending arms 33 and rigidly carrying at approximately its center a complemental arm 34. The ends of the arms 33 are pierced to be pivotally attached to links 35 pivotally mounted upon the plunger 13. A link 36 is also interposed between the bell crank and the feeder head itself and shown as being pivotally connected to the arm 36 at 37 and at 38 to a strap element 39 upon the feeder head. This strap element 39 is adapted to yield downwardly should the charge thrown into the baling chamber be of too great an amount. This is accomplished by the bolt structure 40 passing through the spacing blocks 22 and coöperating with a large aperture or slot in the arcuate portion 41 of the strap element 39. To normally prevent movement of the strap element 39, I rigidly attach thereto a bolt 42 carrying a plurality of washers and having a spring 43 adapted to bear against one of the washers at the upper end of the bolt and against the spacing block 22 at its lower end. By this construction, the feeder head may yield slightly under the condition noted above.

The operation of my device is as follows: Assuming the plunger to be in its rearmost position as shown in Fig. 1, it will be apparent that the pitman driven by the cross pin 11 will also be at the extreme rear end of its stroke. Forward movement of the plunger will oscillate the bell crank by means of the link connection 35 with the arm 33 and will consequently elevate the feeder head through the link connection 36 between the feeder head itself and the arm 34 of the bell crank. The raising of the feeder head will continue until the plunger has moved through the greater portion of its stroke, or more clearly, until it has assumed the position shown in full lines in Fig. 2. Continued forward movement of the plunger from this position causes a slight dip of the feeder head as indicated by the dash lines of Fig. 2. It will be apparent that return movement of the plunger will cause the feeder head to be again elevated from the dash line position to the full line position and the time between these two full line positions is approximately one-quarter revolution of the twin gears 9. It will thus be apparent that the feeder head is in a substantially stationary position for approximately one-quarter of the time required for the plunger to make a complete stroke and it is upon this feature that I claim a particular advantage, in that, it gives the attendant a maximum amount of time to place the charge. The remaining portion of the return stroke of the plunger will move the feeder head into the baling chamber with considerable rapidity. Another advantage attained by this construction or by a construction wherein the motion of the feeder head is taken off of a lineal movement, is that the time required for moving the feeder head from its elevated position to its position within the baling chamber is the same as that required for removing the feeder head from the baling chamber back to its elevated position. It will also be noted that the various positions of the feeder head with respect to the plunger in its forward movement, are absolutely the same upon the return movement of the plunger. However, the essential feature of importance in my invention, resides in maintaining a substantially stationary position of the feeder head in its elevated position during a perceptible movement of the plunger or approximately one-quarter of the stroke of the plunger.

What I claim, is:

1. In a hay press, a plunger, an oscillating reciprocating pitman connected to said plunger, a feeder head, and means for imparting motion to said feeder head, said means being such that the feeder head will be in the same position after a perceptible return of the plunger from the end of its stroke as it is at the extreme end of the stroke.

2. In a hay press, a plunger, an oscillating reciprocating pitman connected to said plunger, a feeder head pivoted to the framework of the press, a bell crank also pivotally mounted on the framework at a point above the path of travel of the plunger, a link connection between one arm of said bell crank and said plunger, and a link connection between the other arm of said bell crank and the feeder head.

3. In a hay press, a plunger, an oscillatory reciprocatory pitman connected to said plunger, a feeder head pivoted to the framework of the press, a bell crank also pivotally mounted on the framework at a point above the path of travel of said plunger, a link connection between one arm of said bell crank and said plunger and a link yieldingly mounted between the other arm of said bell crank and the feeder head.

4. In a hay press, a plunger, an oscillating reciprocating pitman connected to said plunger, a pivotally mounted feeder head comprising an arm portion and a lever portion pivotally connected together, a bell crank carried by the main press framework, a link of connection between one arm of said bell crank and the plunger and a resilient connection between the other arm of said bell crank and the lever portion of said feeder head.

In testimony whereof I affix my signature in presence of two witnesses.

JOHN W. BURKETT.

Witnesses:
 WALTER E. L. BOCK,
 C. C. SHEPHERD.

Copies of this patent may be obtained for five cents each, by addressing the "Commissioner of Patents, Washington, D. C."